US012770892B2

(12) United States Patent
Ito et al.

(10) Patent No.: US 12,770,892 B2
(45) Date of Patent: Oct. 20, 2026

(54) FUEL CELL UNIT AND METHOD OF ASSEMBLING THEREOF

(71) Applicants: TOYOTA JIDOSHA KABUSHIKI KAISHA, Toyota (JP); TOYODA IRON WORKS CO., LTD., Toyota (JP)

(72) Inventors: Masayuki Ito, Sunto-gun (JP); Mikihiro Hori, Nagoya (JP); Kunihiro Iwata, Toyota (JP); Daiki Shimada, Toyota (JP)

(73) Assignees: TOYOTA JIDOSHA KABUSHIKI KAISHA, Toyota (JP); TOYODA IRON WORKS CO., LTD., Toyota (JP)

( * ) Notice: Subject to any disclaimer, the term of this patent is extended or adjusted under 35 U.S.C. 154(b) by 682 days.

(21) Appl. No.: 18/314,355

(22) Filed: May 9, 2023

(65) Prior Publication Data

US 2023/0369611 A1 Nov. 16, 2023

(30) Foreign Application Priority Data

May 10, 2022 (JP) ................................ 2022-077667

(51) Int. Cl.

*H01M 8/0206* (2016.01)
*H01M 8/2404* (2016.01)
*H01M 8/2475* (2016.01)
*H01M 8/248* (2016.01)

(52) U.S. Cl.

CPC ....... *H01M 8/0206* (2013.01); *H01M 8/2404* (2016.02); *H01M 8/2475* (2013.01); *H01M 8/248* (2013.01); *H01M 2250/40* (2013.01)

(58) Field of Classification Search

CPC ............ H01M 8/0206; H01M 8/2404; H01M 8/2475; H01M 8/248; H01M 8/2465; H01M 2250/40; H01M 2250/20; Y02E 60/50

See application file for complete search history.

(56) References Cited

U.S. PATENT DOCUMENTS

2011/0177381 A1 7/2011 Oya et al.

FOREIGN PATENT DOCUMENTS

JP 2010272458 A 12/2010
JP 2020102382 A 7/2020
JP 2019175719 A 5/2022
WO 2010052788 A1 5/2010

*Primary Examiner* — Eugenia Wang

(74) *Attorney, Agent, or Firm* — Hunton Andrews Kurth LLP

(57) ABSTRACT

A fuel cell unit includes: a fuel cell stack in which a plurality of fuel cells are stacked; an electrical device; and a bus bar electrically connecting between a terminal of the fuel cell stack and a terminal of the electrical device. The bus bar includes a non-joined portion in which a plurality of metal plates are stacked without being joined to each other. The plurality of metal plates include a first metal plate and a second metal plate thicker than the first metal plate.

8 Claims, 18 Drawing Sheets

FUEL CELL UNIT AND METHOD OF ASSEMBLING THEREOF

CROSS-REFERENCE TO RELATED APPLICATION

The present disclosure claims priority to Japanese Patent Application No. 2022-077667, filed on May 10, 2022, the contents of which application are incorporated herein by reference in their entirety.

BACKGROUND

Technical Field

The present disclosure relates to a fuel cell unit including a bus bar and a method of assembling the same.

Background Art

Patent Literature 1 discloses a fuel cell unit. The fuel cell unit has a fuel cell stack including a cell stack body in which a plurality of fuel cells are stacked. The fuel cell unit further includes an electrical device electrically connected to the fuel cell stack. A bus bar is provided so as to electrically connect a terminal of the fuel cell stack and a terminal of the electrical device. A size of the cell stack body in a stack direction varies depending on an environment. In conjunction with a change in the size of the cell stack body, a position of the terminal of the fuel cell stack also changes. The bus bar has a U-shaped bent portion (following portion) so as to be able to deform following the displacement of the terminal of the fuel cell stack.

LIST OF RELATED ART

Patent Literature 1: Japanese Laid-Open Patent Application No. JP-2020-102382

SUMMARY

A bus bar that electrically connects a terminal of a fuel cell stack and a terminal of an electrical device in a fuel cell unit is considered. A cell stack body included in the fuel cell stack expands or contracts in a stack direction according to an environment. In conjunction with such the expansion or contraction of the cell stack body, a position of the terminal of the fuel cell stack also changes. In addition, manufacturing variability or the like may cause variations in a relative positional relationship between the terminal of the fuel cell stack and the terminal of the electrical device. In order to absorb such the environment-dependent displacement and the relative positional variation, it is desirable that the bus bar has "flexibility."

Meanwhile, when the bus bar is excessively flexible, it becomes difficult to smoothly perform an operation of installing the bus bar between the terminal of the fuel cell stack and the terminal of the electrical device. That is, "assemblability" of the bus bar decreases.

An object of the present disclosure is to provide a technique capable of balancing flexibility and assemblability of a bus bar that electrically connects between a fuel cell stack and an electrical device in a fuel cell unit.

A first aspect relates to a fuel cell unit.

The fuel cell unit includes:

a fuel cell stack in which a plurality of fuel cells are stacked;

an electrical device; and a bus bar electrically connecting between a terminal of the fuel cell stack and a terminal of the electrical device.

The bus bar includes a non-joined portion in which a plurality of metal plates are stacked without being joined to each other.

The plurality of metal plates include a first metal plate and a second metal plate thicker than the first metal plate.

According to the first aspect, the bus bar includes the non-joined portion in which the plurality of metal plates are stacked without being joined to each other. Therefore, flexibility of the non-joined portion is remarkably increased as compared with a case where the plurality of metal plates are joined to form one thick metal plate. The high flexibility of the non-joined portion means that the non-joined portion is easily deformed. Since the non-joined portion is easily deformed, it is possible to easily absorb the environment-dependent displacement of the terminal and the variation in the relative positional relationship between the terminals. In addition, since the plurality of metal plates are stacked, a cross-sectional area of the non-joined portion as a whole is sufficiently secured, which can prevent an increase in resistance. Furthermore, the plurality of metal plates in the non-joined portion includes the first metal plate and the second metal plate thicker than the first metal plate. The relatively thick second metal plate has a higher stiffness than the first metal plate and thus is less likely to be deflected by the gravity. Therefore, the second metal plate contributes to maintaining a posture (shape) of the bus bar (non-joined portion) during assembly. That is, the second metal plate improves the assemblability of the bus bar. As described above, according to the first aspect, it is possible to secure all of the "low resistance," the "flexibility," and the "assemblability" of the bus bar.

A second aspect further has the following feature in addition to the first aspect.

The non-joined portion includes a bent portion in which the plurality of metal plates are bent.

According to the second aspect, the non-joined portion includes the bent portion, and thus the non-joined portion is easily deformed two dimensionally. Therefore, it is possible to easily absorb a variety of environment-dependent displacements of the terminal. In addition, it is possible to easily absorb a variety of variations in the relative positional relationship between the terminals.

A third aspect further has the following feature in addition to the first or second aspect.

The second metal plate is smaller in number than the first metal plate. The number of the second metal plate may be one.

According to the third aspect, it is possible to efficiently secure the low resistance, the flexibility, and the assemblability regarding the bus bar without unnecessarily reducing the flexibility.

A fourth aspect further has the following feature in addition to any one of the first to third aspects.

The number of the first metal plate is two or more. The second metal plate is sandwiched between the two or more first metal plates.

The second metal plate has a first surface and a second surface opposite to the first surface. The number of the first metal plate present on a side of the first surface of the second metal plate may be equal to the number of the first metal plate present on a side of the second surface of the second metal plate.

According to the fourth aspect, the first metal plate can be deformed more freely without being restricted by the second metal plate. Therefore, the flexibility of the non-joined portion is further improved.

A fifth aspect further has the following feature in addition to any one of the first to third aspects.

The second metal plate is disposed lowermost in a direction of gravitational force among the plurality of metal plates.

According to the fifth aspect, the second metal plate is present below the first metal plate, and the first metal plate is supported by the second metal plate. Therefore, deflection of the first metal plate due to the gravity is prevented. As a result, the first metal plate is prevented from being deflected and coming into contact with another component such as an electrical device.

A sixth aspect further has the following feature in addition to any one of the first to third aspects.

The second metal plate is disposed uppermost in a direction of gravitational force among the plurality of metal plates.

According to the sixth aspect, the first metal plates are easily dispersed in the direction of gravitational force, and thus the first metal plates are unlikely to be a bundle. This is preferable from a viewpoint of the flexibility of the non-joined portion.

A seventh aspect further has the following feature in addition to any one of the first to third aspects.

The bus bar further includes: a first connection portion connected to the terminal of the fuel cell stack; and a second connection portion connected to the terminal of the electrical device.

The non-joined portion is present between the first connection portion and the second connection portion.

An eighth aspect further has the following feature in addition to the seventh aspect.

The non-joined portion includes a bent portion in which the plurality of metal plates are bent.

At the bent portion closest to the second connection portion, the second metal plate is located outermost among the plurality of metal plates.

In the non-joined portion, the second metal plate may be longer than the first metal plate.

According to the eighth aspect, it is possible to effectively suppress a maximum stress value of the bus bar as a whole.

A ninth aspect further has the following feature in addition to the seventh aspect.

The plurality of metal plates are joined to each other in each of the first connection portion and the second connection portion.

According to the ninth aspect, stiffnesses of the first connection portion and the second connection portion of the bus bar are increased, and thus connection to the terminal is facilitated.

A tenth aspect relates to a method of assembling a fuel cell unit.

The fuel cell unit includes a fuel cell stack in which a plurality of fuel cells are stacked and an electrical device.

The method of assembling includes:

- forming a bus bar in which a plurality of metal plates including a first metal plate and a second metal plate thicker than the first metal plate are stacked;
- electrically connecting a first connection portion of the bus bar to a terminal of the fuel cell stack; and
- electrically connecting a second connection portion of the bus bar to a terminal of the electrical device.

The forming the bus bar includes joining the plurality of metal plates to each other in each of the first connection portion and the second connection portion without joining the plurality of metal plates to each other in a non-joined portion between the first connection portion and the second connection portion.

According to the tenth aspect, the same effects as in the first aspect and the ninth aspect described above are obtained.

According to the present disclosure, it is possible to secure all of the "low resistance," the "flexibility," and the "assemblability" regarding the bus bar of the fuel cell unit.

EMBODIMENTS

Embodiments of the present disclosure will be described with reference to the accompanying drawings.

1. OVERALL CONFIGURATION OF FUEL CELL UNIT

Figure 1:
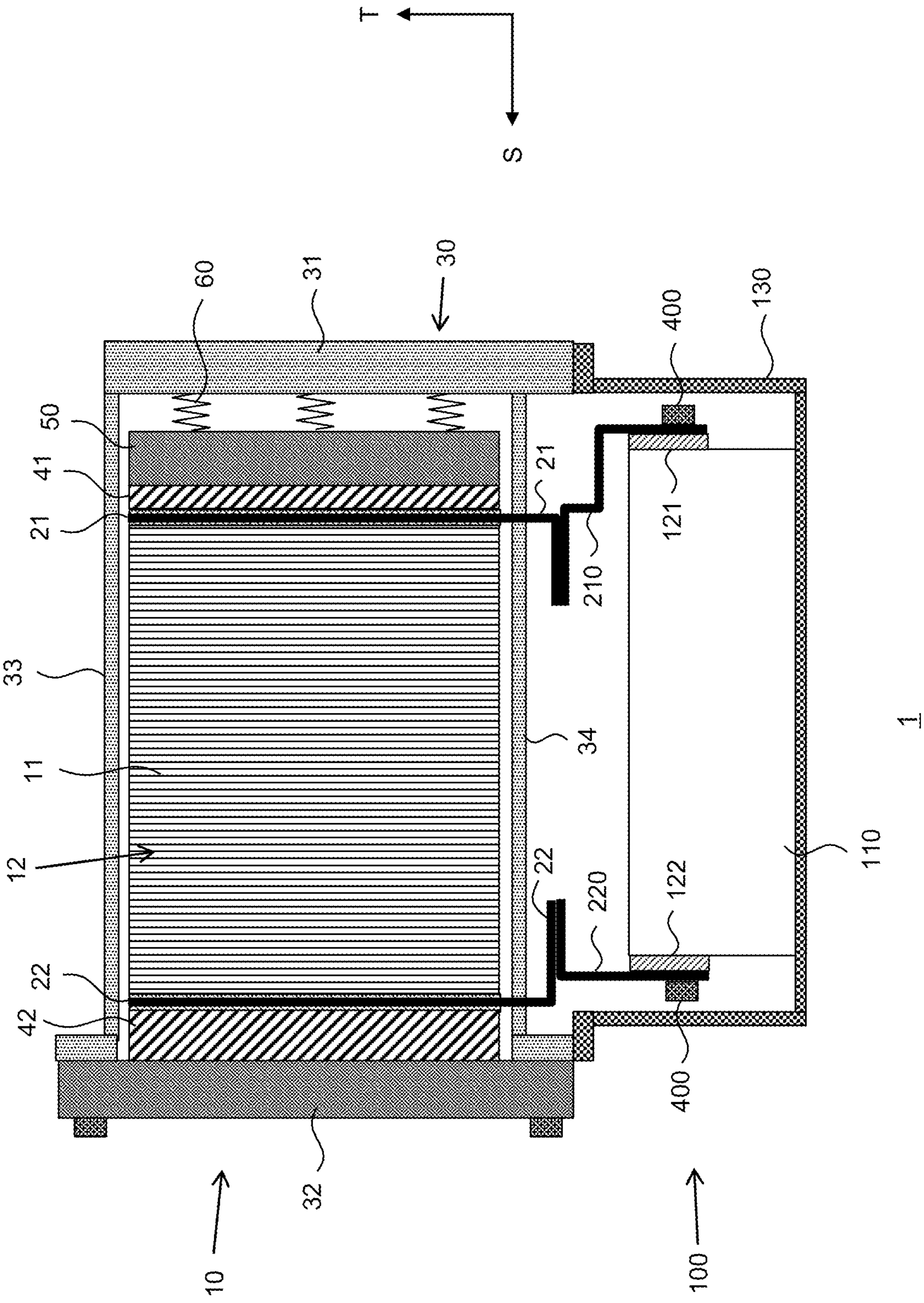
FIG. 1 is a schematic view showing a configuration example of a fuel cell unit according to an embodiment of the present disclosure.

FIG. 1 is a schematic view showing a configuration example of a fuel cell unit 1 according to the present embodiment. The fuel cell unit 1 includes a fuel cell stack 10 and an electrical device unit 100. The fuel cell stack 10 and the electrical device unit 100 are integrally combined to form the fuel cell unit 1.

The fuel cell stack 10 includes a cell stack body 12 in which a plurality of fuel cells 11 are stacked in series. Each fuel cell 11 includes an electrolyte membrane, and a cathode electrode and an anode electrode on both sides of the electrolyte membrane. In the following description, an S-direction represents the stack direction of the plurality of fuel cells 11. A T-direction represents a direction parallel to each fuel cell 11. The S-direction and the T-direction are orthogonal to each other.

The fuel cell stack 10 further includes a first battery terminal 21 and a second battery terminal 22. The first battery terminal 21 and the second battery terminal 22 are respectively connected to both ends of the cell stack body 12 in the S-direction. For example, each of the first battery terminal 21 and the second battery terminal 22 has a plate shape. Examples of material of the first battery terminal 21 and the second battery terminal 22 include copper and the like.

A stack case 30 is a case of the fuel cell stack 10. The stack case 30 includes end plates 31 and 32, and connecting portions 33 and 34 that connect between the end plates 31 and 32. Examples of material of the stack case 30 include stainless steel, aluminum alloy, and the like. The cell stack body 12 is housed in the stack case 30. An insulator 41, a pressure plate 50, and a spring 60 are disposed between the first battery terminal 21 and the end plate 31. An insulator 42 is disposed between the second battery terminal 22 and the end plate 32. A compressive load in the S-direction is applied to the cell stack body 12 by a reaction force of the spring 60. Since the compressive load applied to the cell stack body 12 can be maintained within a certain range, it is possible to easily maintain a power generation performance and a sealing performance.

One end of each of the first battery terminal 21 and the second battery terminal 22 protrudes to the outside of the cell stack body 12 and extends toward the electrical device unit 100.

The electrical device unit 100 includes an electrical device 110, a first terminal block 121, a second terminal block 122, and a case 130.

The electrical device 110 is electrically connected to the fuel cell stack 10. For example, the electrical device 110 is a boost converter that boosts an output voltage of the fuel cell stack 10. As another example, the electrical device 110 may be a buck converter that steps down the output voltage of the fuel cell stack 10. The electrical device 110 may be a buck-boost converter. As still another example, the electrical device 110 may be an inverter that converts a DC output from the fuel cell stack 10 into AC. The electrical device 110 may be any device that is electrically connected to the fuel cell stack 10.

The first terminal block 121 and the second terminal block 122 are terminals of the electrical device 110.

The electrical device 110, the first terminal block 121, and the second terminal block 122 are housed in the case 130.

In a state where the fuel cell stack 10 and the electrical device unit 100 are integrally combined with each other, the electrical device 110 is separated from the fuel cell stack 10. In the example shown in FIG. 1, the fuel cell stack 10 and the electrical device 110 are separated from each other in the T-direction. A bus bar is used for electrically connecting between the fuel cell stack 10 and the electrical device 110.

More specifically, the fuel cell unit 1 includes a first bus bar 210 and a second bus bar 220. The first bus bar 210 electrically connects between the first battery terminal 21 of the fuel cell stack 10 and the first terminal block 121 of the electrical device 110. On the other hand, the second bus bar 220 electrically connects between the second battery terminal 22 of the fuel cell stack 10 and the second terminal block 122 of the electrical device 110. Typically, each of the first bus bar 210 and the second bus bar 220 has a plate shape. Examples of material of the first bus bar 210 and the second bus bar 220 include copper, aluminum, alloy containing a large amount of copper or aluminum, and the like.

Figure 2:
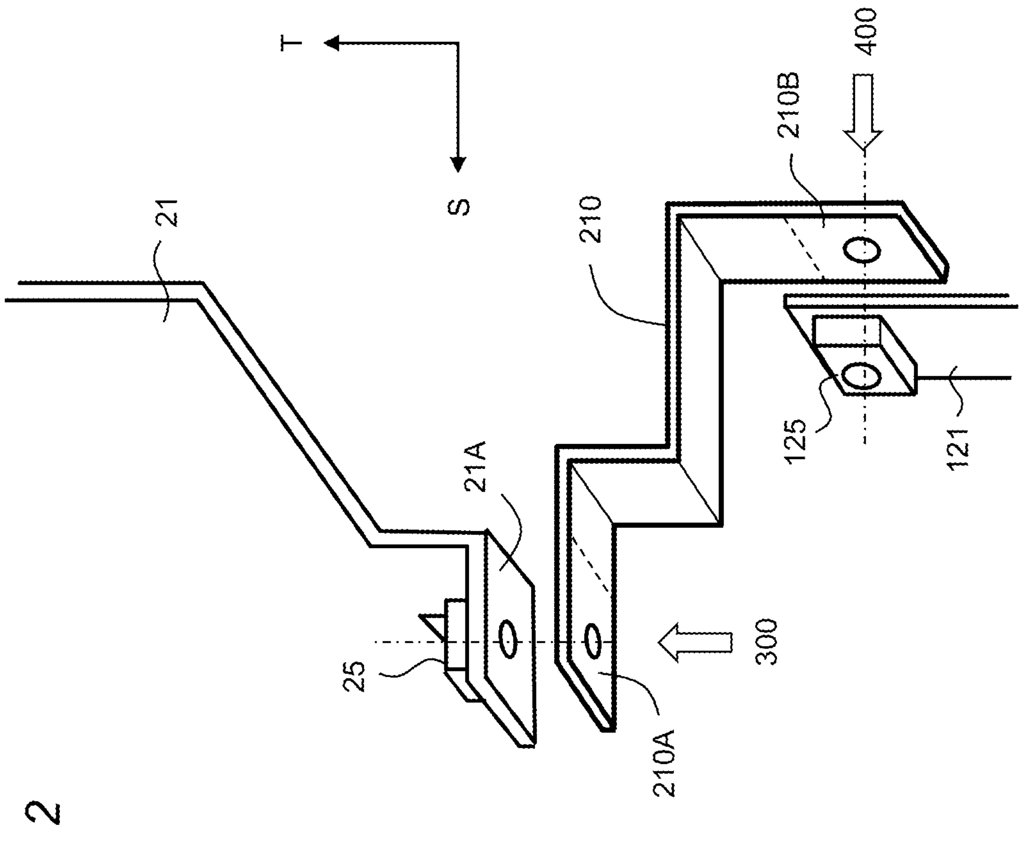
FIG. 2 is a schematic view for explaining an example of electrical connection of a bus bar in the fuel cell unit according to an embodiment of the present disclosure.

FIG. 2 is a schematic view for explaining an example of electrical connection of the first bus bar 210 in the fuel cell unit 1. The first bus bar 210 includes a first connection portion 210A connected to the first battery terminal 21 and a second connection portion 210B connected to the first terminal block 121. The first connection portion 210A and the second connection portion 210B are located apart from each other on the first bus bar 210. For example, the first connection portion 210A and the second connection portion 210B are located at both ends of the first bus bar 210. The first connection portion 210A is fixed to the first battery terminal 21. On the other hand, the second connection portion 210B is fixed to the first terminal block 121.

In the example shown in FIG. 2, a tip portion 21A of the first battery terminal 21 is bent. The tip portion 21A of the first battery terminal 21 is parallel to the S-direction and intersects with the T-direction. The first connection portion 210A of the first bus bar 210 is also parallel to the S-direction and intersects with the T-direction. A nut 25 is joined to the tip portion 21A of the first battery terminal 21. The tip portion 21A of the first battery terminal 21 and the first connection portion 210A of the first bus bar 210 are fastened by a bolt 300.

On the other hand, the first terminal block 121 is parallel to the T-direction and intersects with the S-direction. The second connection portion 210B of the first bus bar 210 is also parallel to the T-direction and intersects with the S-direction. A nut 125 is joined to the first terminal block 121. The first terminal block 121 and the second connection portion 210B of the first bus bar 210 are fastened by a bolt 400.

In the example shown in FIG. 2, a plane parallel to the first connection portion 210A and a plane parallel to the second connection portion 210B intersect with each other. In this case, the first bus bar 210 has at least one bent portion between the first connection portion 210A and the second connection portion 210B. The number of bent portions is not particularly limited. A curvature of the bent portion is not particularly limited. A portion between the first connection portion 210A and the second connection portion 210B may be bent in a large arc shape.

The second bus bar 220 is the same as the first bus bar 210.

2. METHOD FOR ASSEMBLING FUEL CELL UNIT

FIGS. 3 to 7 are views for explaining a method of assembling the fuel cell unit 1 shown in FIGS. 1 and 2. In FIGS. 3 to 7, a direction of gravitational force is indicated by an arrow.

Figure 3:
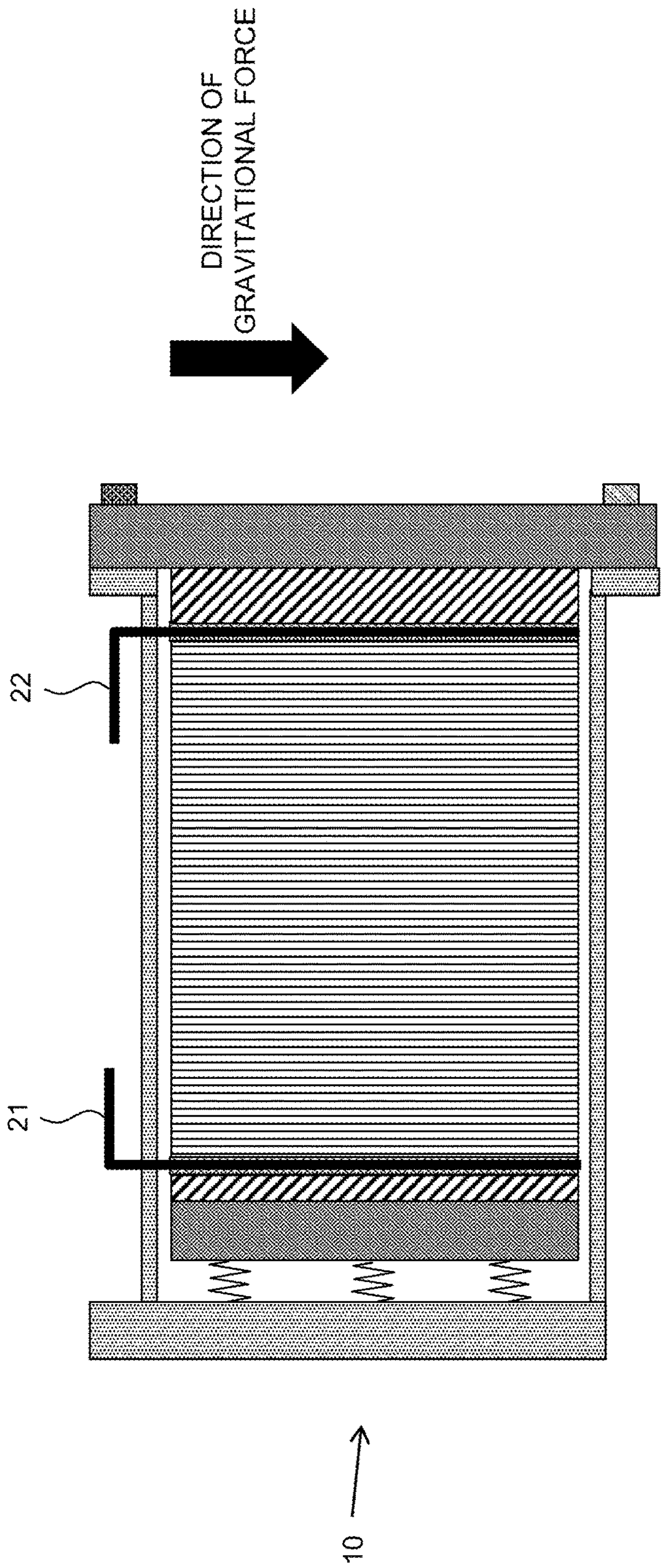
FIG. 3 is a diagram for explaining a method of assembling the fuel cell unit according to an embodiment of the present disclosure.

First, the fuel cell stack 10 is prepared. As described above, one end of each of the first battery terminal 21 and the second battery terminal 22 of the fuel cell stack 10 protrudes to the outside of the cell stack body 12. As shown in FIG. 3, the fuel cell stack 10 is placed so that the first battery terminal 21 and the second battery terminal 22 protruding outward can be seen from the above. It should be noted that since the tip portions of the protruding first battery terminal 21 and second battery terminal 22 are bent (see FIG. 2), a height of the protruding portions is suppressed to be low.

Figure 4:
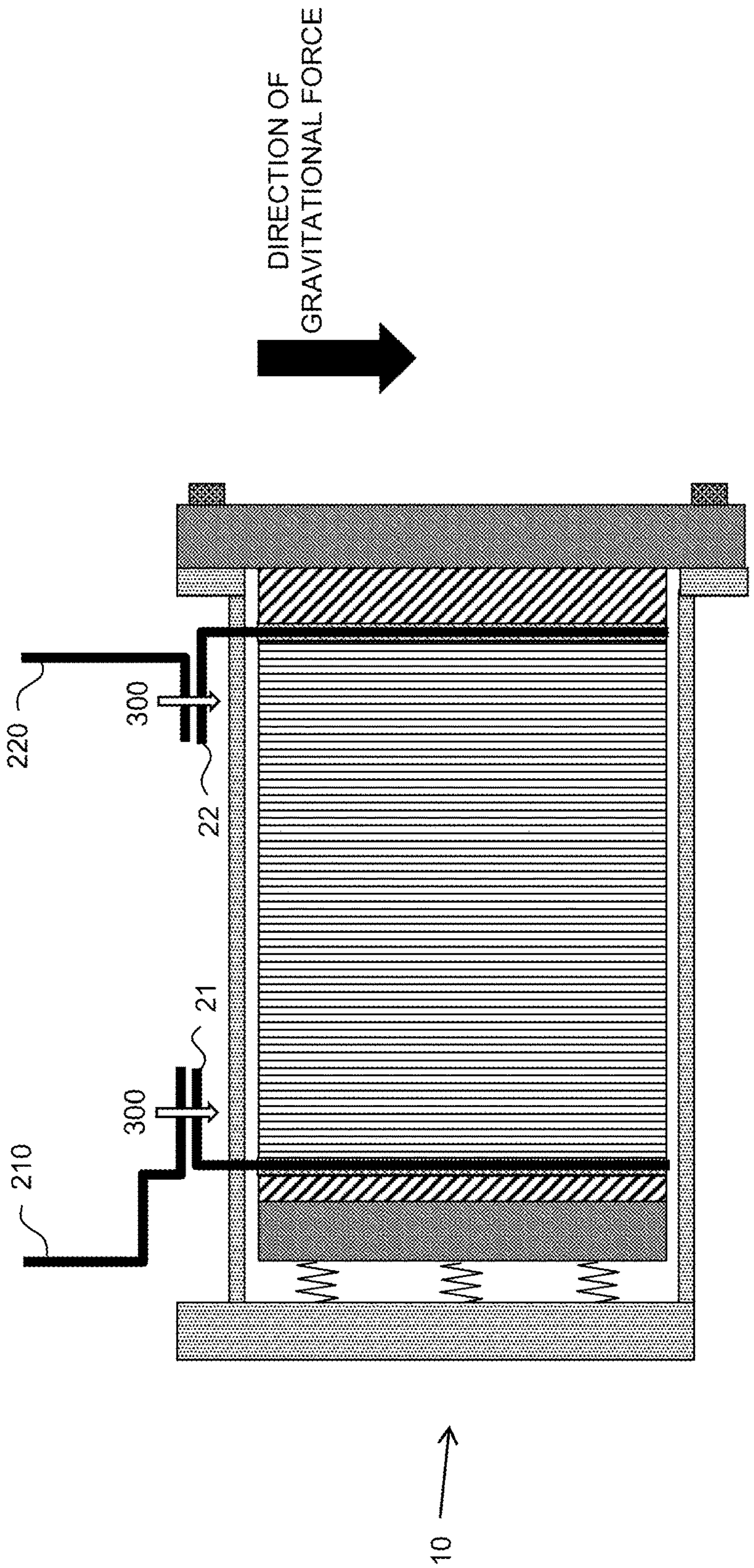
FIG. 4 is a diagram for explaining the method of assembling the fuel cell unit according to an embodiment of the present disclosure.

Next, as shown in FIG. 4, the first bus bar 210 formed in advance is fastened to the first battery terminal 21 from the above by the bolt 300 (see FIG. 2). At this time, since the tip portion of the first battery terminal 21 is bent, it is easy to fasten the first bus bar 210 from the above by the bolt 300. Similarly, the second bus bar 220 formed in advance is fastened to the second battery terminal 22 from the above by the bolt 300. It should be noted that a detailed structure of the bus bar and a method for forming the bus bar according to the present embodiment will be described later in detail.

Figure 5:
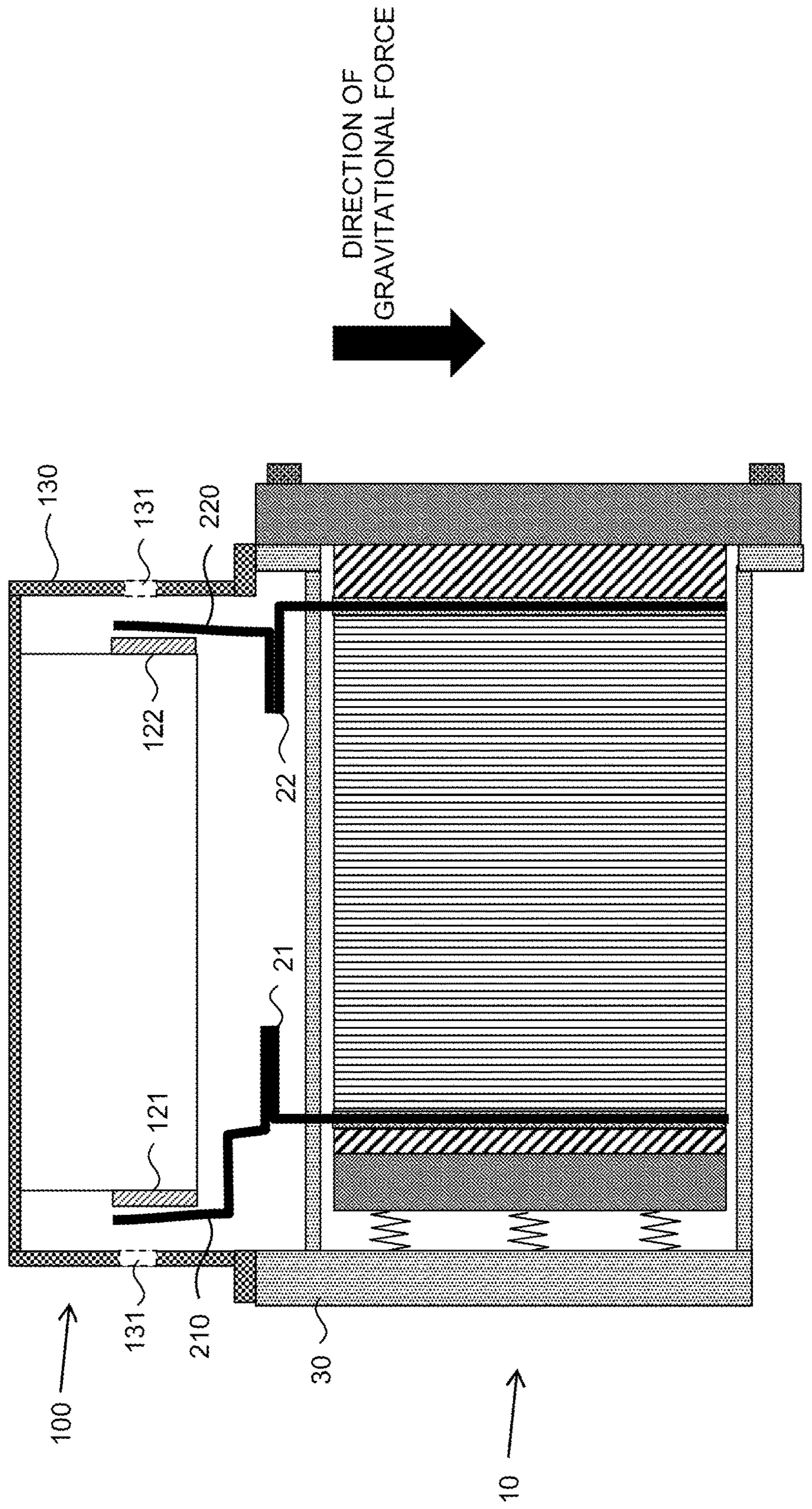
FIG. 5 is a diagram for explaining the method of assembling the fuel cell unit according to an embodiment of the present disclosure.

Next, as shown in FIG. 5, the electrical device unit 100 is placed on the fuel cell stack 10. At this time, a lower side of the electrical device unit 100 is opened. The stack case 30 of the fuel cell stack 10 and the case 130 of the electrical device unit 100 are fastened to each other by bolts (not shown). Openings 131 are provided on side surfaces of the case 130 of the electrical device unit 100.

Figure 6:
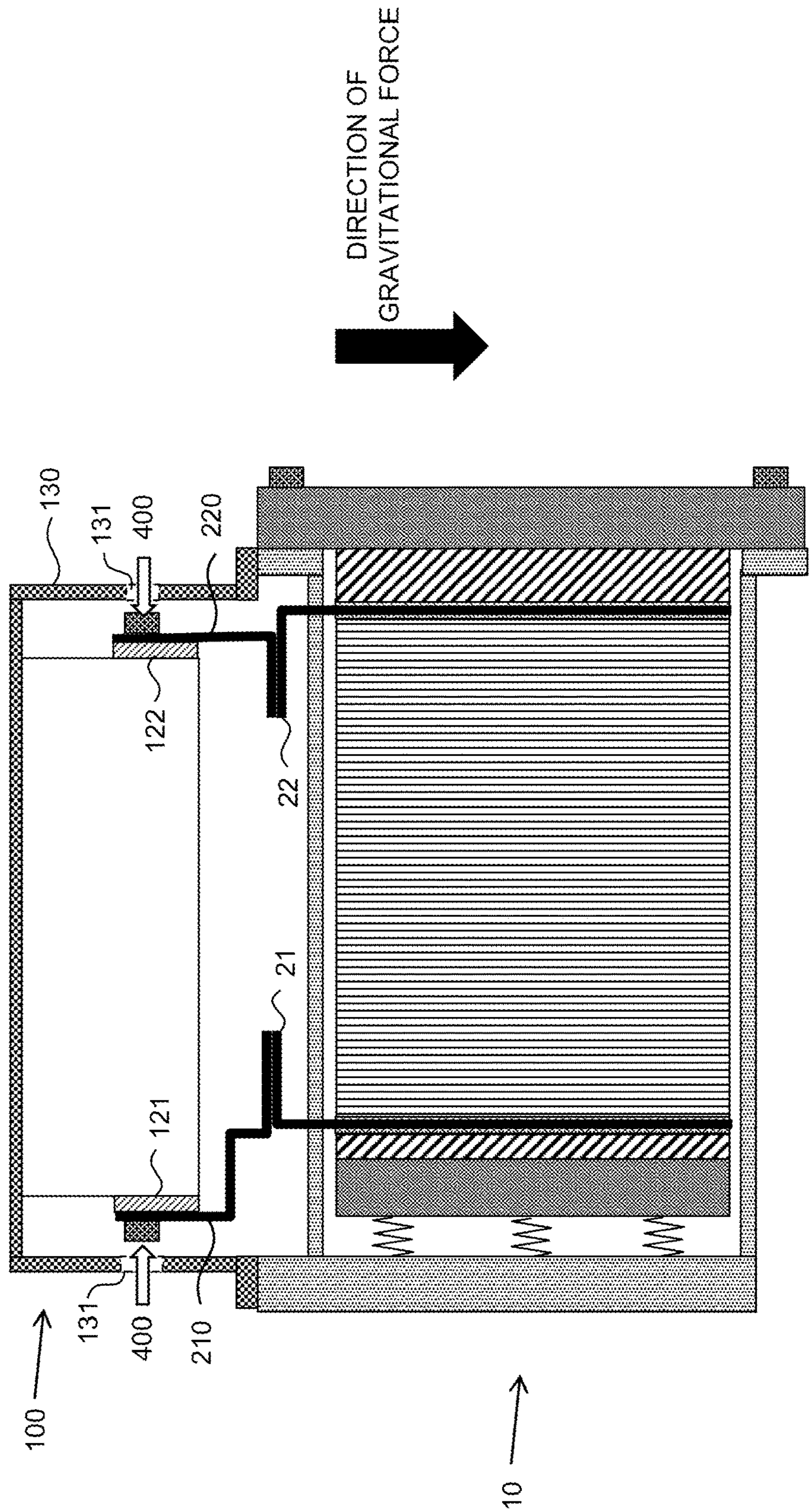
FIG. 6 is a diagram for explaining the method of assembling the fuel cell unit according to an embodiment of the present disclosure.
Figure 7:
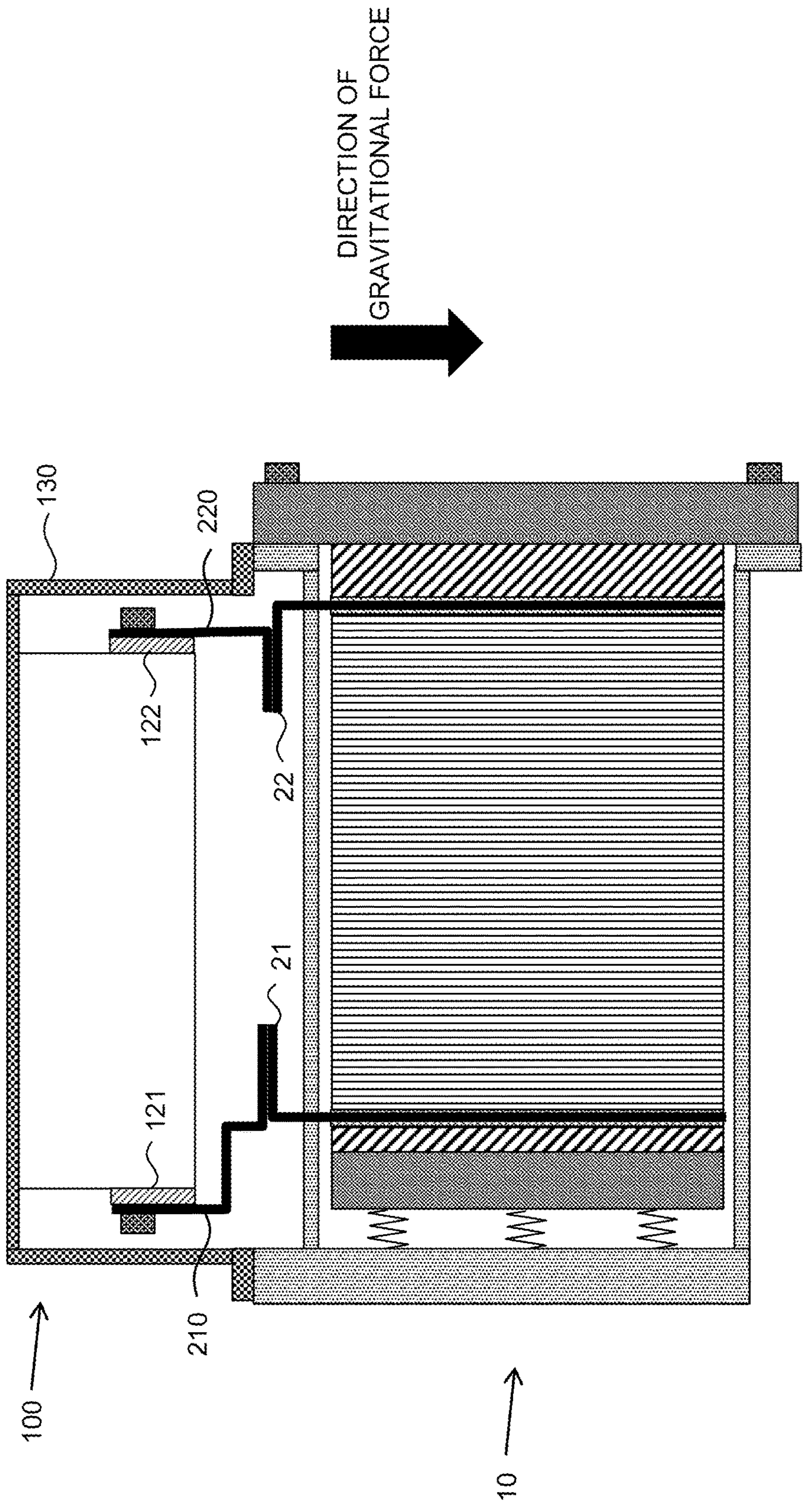
FIG. 7 is a diagram for explaining the method of assembling the fuel cell unit according to an embodiment of the present disclosure.

Next, as shown in FIG. 6, the bolt 400 is inserted through the opening 131 on the side surface of the case 130. Then, the first bus bar 210 is fastened to the first terminal block 121 from the side by the bolt 400 (see FIG. 2). Similarly, the second bus bar 220 is fastened to the second terminal block 122 from the side by the bolt 400. Finally, as shown in FIG. 7, the openings 131 on the side surface of the case 130 are covered.

3. FEATURES OF BUS BAR

The cell stack body 12 included in the fuel cell stack 10 expands or contracts in the S-direction (i.e., the stack direction) according to an environment. For example, the cell stack body 12 expands under a high temperature condition and contracts under a low temperature condition. As another example, when a relative humidity inside the fuel cell 11 is high, the electrolyte membrane inside the fuel cell 11 absorbs water and thus expands. As still another example, when the compressive load is applied to the cell stack body 12 for a long period of time, a resin member slightly creeps and thus the cell stack body 12 contracts.

When the cell stack body 12 expands or contracts in the S-direction, a terminal position changes in the S-direction in conjunction with that. Typically, a position of the first battery terminal 21 disposed on the side of the spring 60 changes in the S-direction in conjunction with the expansion or contraction of the cell stack body 12. In order to absorb such the environment-dependent displacement of the first battery terminal 21, it is desirable that the first bus bar 210 has flexibility.

In addition, manufacturing variability or the like may cause variations in a relative positional relationship between the first battery terminal 21 of the fuel cell stack 10 and the first terminal block 121 of the electrical device 110. In order to absorb such the relative positional variation, it is desirable that the first bus bar 210 has flexibility. Similarly, manufacturing variability or the like may cause variations in a relative positional relationship between the second battery terminal 22 of the fuel cell stack 10 and the second terminal block 122 of the electrical device 110. In order to absorb such the relative positional variation, it is desirable that the second bus bar 220 has flexibility.

In view of the above, the present disclosure proposes a bus bar having appropriate flexibility. Hereinafter, the first bus bar 210 will be described as an example. Similar features are also applicable to the second bus bar 220.

In the following description, for the sake of simplicity, the first bus bar 210 is simply referred to as a "bus bar 210," the first battery terminal 21 of the fuel cell stack 10 is simply referred to as a "battery terminal 21," and the first terminal block 121 of the electrical device 110 is simply referred to as a "terminal 121."

3-1. Securing Flexibility

A bending stiffness of a plate-shaped member is represented by a product of the Young's modulus and a second moment of area. The second moment of area is proportional to the cube of a plate thickness. Therefore, as the plate thickness decreases, the bending stiffness of the plate-shaped member decreases. In other words, as the plate thickness decreases, the flexibility of the plate-shaped member increases.

In order to increase the flexibility of the bus bar 210, it may be conceivable to simply make the bus bar 210 thin. However, when a cross-sectional area of the bus bar 210 becomes small, its resistance increases, a large current becomes hard to flow, and moreover heat generation increases. Therefore, a certain amount of the cross-sectional area is required for the bus bar 210.

In view of the above, according to the present embodiment, the bus bar 210 is constituted by a plurality of thin metal plates instead of one metal plate. That is, one metal plate is divided into a plurality of thin metal plates. As described above, since the bending stiffness is proportional to the cube of the plate thickness, the flexibility is higher in the case of a plurality of thin metal plates than in the case of one metal plate, even if the plate thickness as a whole is the same. That is, it is possible to increase the flexibility of the bus bar 210 without increasing the resistance.

Figure 8:
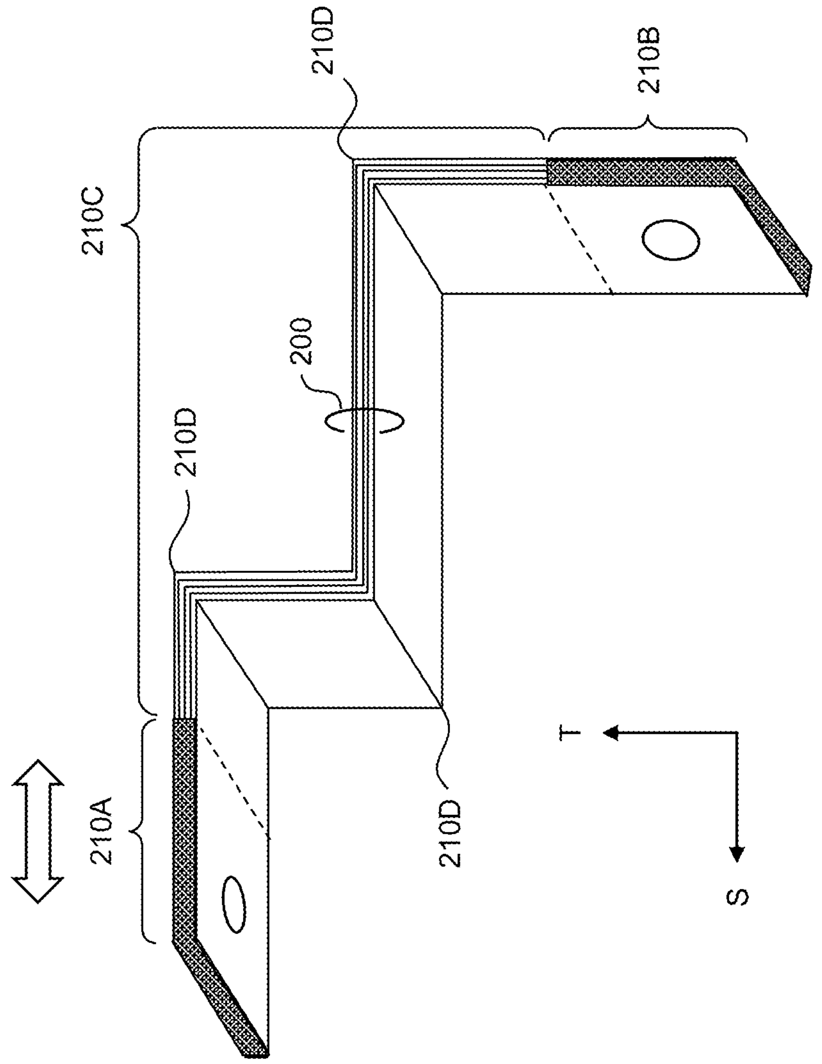
FIG. 8 is a schematic view for explaining an example of a bus bar using a plurality of metal plates according to an embodiment of the present disclosure.

FIG. 8 is a schematic view for explaining an example of the bus bar 210 using a plurality of metal plates 200. The plurality of metal plates 200 are stacked. Here, "stacked" means that they are arranged in layers and in parallel with each other. Adjacent metal plates 200 do not necessarily need to be in contact with each other. Examples of material of the metal plate 200 include copper, aluminum, an alloy containing a large amount of copper or aluminum, and the like.

The bus bar 210 includes the first connection portion 210A connected to the battery terminal 21 of the fuel cell stack 10 and the second connection portion 210B connected to the terminal 121 of the electrical device 110. The first connection portion 210A and the second connection portion 210B are located apart from each other on the bus bar 210. For example, the first connection portion 210A and the second connection portion 210B are located at both ends of the bus bar 210.

In each of the first connection portion 210A and the second connection portion 210B, the plurality of metal plates 200 are joined to each other. In other words, the first connection portion 210A and the second connection portion 210B are formed by joining the plurality of metal plates 200 to each other. For example, the plurality of metal plates 200 are joined by thermal compression bonding. As another example, the plurality of metal plates 200 may be joined by swaging. As still another example, the plurality of metal plates 200 may be joined by welding. Since the plurality of metal plates 200 are joined to each other, stiffnesses of the first connection portion 210A and the second connection portion 210B are increased, and thus connection to the battery terminal 21 and the terminal 121 is facilitated. Preferably, the plurality of metal plates 200 are joined over the entire surface. When the plurality of metal plates 200 are joined over the entire surface, the first connection portion 210A and the second connection portion 210B can behave as a single plate, thereby preventing the outermost metal plate 200 from turning outward when the bolt is fastened.

A portion of the bus bar 210 between the first connection portion 210A and the second connection portion 210B is hereinafter referred to as a "non-joined portion 210C." In the non-joined portion 210C, the plurality of metal plates 200 are stacked without being joined (coupled) to each other. That is, in the non-joined portion 210C, the plurality of metal plates 200 are stacked independently of each other. Here, "stacked" means that they are arranged in layers and in parallel with each other. Adjacent metal plates 200 may be in contact with each other or may not be in contact with each other. In either case, the plurality of metal plates 200 in the non-joined portion 210C are independent of each other without being joined (coupled) to each other. It can be said that the plurality of metal plates 200 in the non-joined portion 210C are connected in parallel between the first connection portion 210A and the second connection portion 210B.

Preferably, the non-joined portion 210C includes a bent portion 210D in which the plurality of metal plates 200 are bent. In the example shown in FIG. 8, there are three bent portions 210D on the non-joined portion 210C. However, the number of bent portions 210D is not particularly limited. A curvature of each bent portion 210D is not particularly limited. The non-joined portion 210C may be bent in a large arc shape. That is, the non-joined portion 210C may be one large bent portion 210D as a whole.

As described above, the bus bar 210 according to the present embodiment includes the non-joined portion 210C in which the plurality of metal plates 200 are stacked without being joined to each other. As described above, the bending stiffness is proportional to the cube of the plate thickness. Therefore, the flexibility of the non-joined portion 210C is remarkably increased as compared with a case where the plurality of metal plates 200 are joined to form one thick metal plate. In addition, since the plurality of metal plates 200 are stacked, a cross-sectional area of the non-joined portion 210C as a whole is sufficiently secured, which can prevent an increase in resistance. In other words, it is possible to secure the flexibility of the bus bar 210 without increasing the resistance of the bus bar 210.

The high flexibility of the non-joined portion 210C means that the non-joined portion 210C is easily deformed. Since the non-joined portion 210C is easily deformed, it is possible to easily change the position of the first connection portion 210A connected to the battery terminal 21. It is therefore possible to easily absorb the environment-dependent displacement of the battery terminal 21.

In addition, since the non-joined portion 210C is easily deformed, it is possible to easily change the relative positional relationship between the first connection portion 210A and the second connection portion 210B. It is therefore possible to easily absorb the variation in the relative positional relationship between the battery terminal 21 and the terminal 121 caused by the manufacturing variability or the like.

In particular, when the non-joined portion 210C has at least one bent portion 210D as shown in FIG. 8, the non-joined portion 210C can be easily deformed freely in the ST-plane. That is, the non-joined portion 210C can be easily deformed in both the S-direction and the T-direction. Therefore, it is possible to easily absorb a variety of environment-dependent displacements of the battery terminal 21. For example, it is possible to easily absorb the displacement in the S-direction caused by expansion or contraction of the cell stack body 12. In addition, it is possible to easily absorb a variety of variations in the relative positional relationship between the battery terminal 21 and the terminal 121.

3-2. Improvement of Assemblability

Figure 9:
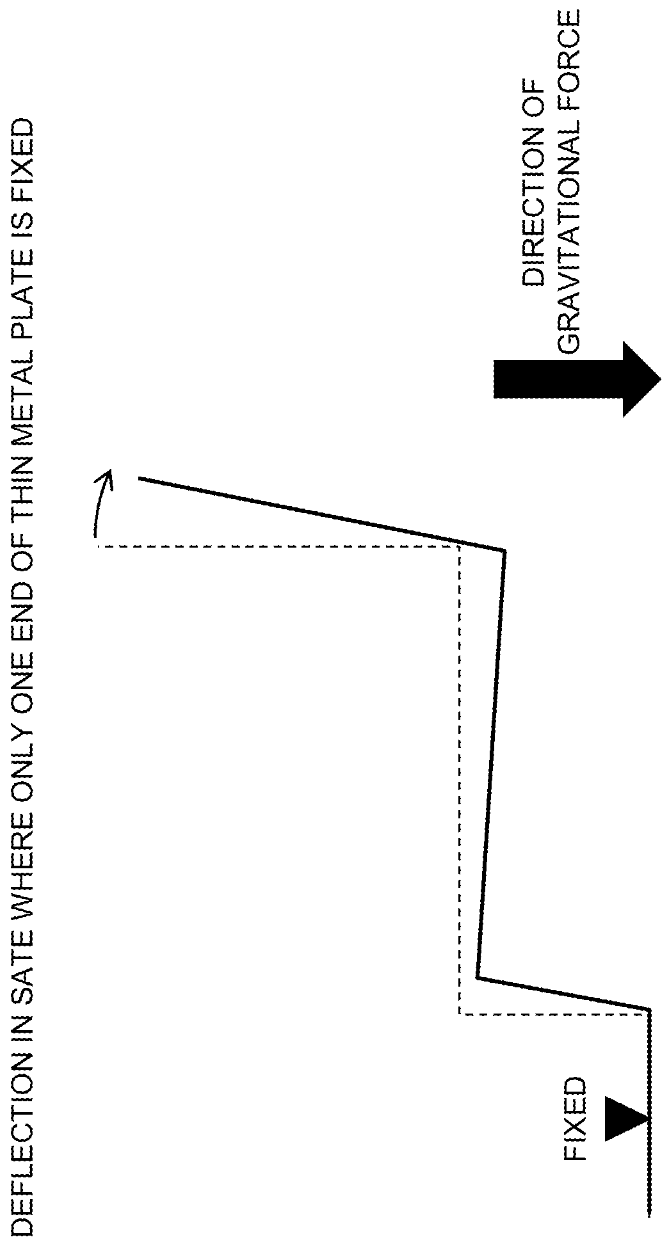
FIG. 9 is a conceptual diagram for explaining a problem.

Regarding assembly of the fuel cell unit 1 described above, the state shown in FIG. 5 is considered. In the state shown in FIG. 5, the first connection portion 210A of the bus bar 210 is already fixed to the battery terminal 21 of the fuel cell stack 10. On the other hand, the second connection portion 210B of the bus bar 210 is not yet fixed to the terminal 121 of the electrical device 110. This corresponds to a so-called "cantilever state." In this case, the bus bar 210 is deflected due to the gravity as shown in FIGS. 5 and 9.

When the bus bar 210 (the non-joined portion 210C) is excessively flexible, the deflection of the bus bar 210 (the non-joined portion 210C) due to the gravity becomes large. As a result, in the state shown in FIG. 5, the second connection portion 210B of the deflected bus bar 210 may become largely away from the position of the terminal 121. In addition, the deflected bus bar 210 may interfere with (come into contact with) the case 130 of the electrical device unit 100 or other components. Therefore, it becomes difficult to smoothly perform an operation of fixing the bus bar 210 to the terminal 121. That is, "assemblability" of the bus bar 210 decreases.

In view of the above, the present disclosure further proposes a technique capable of securing not only the flexibility but also the assemblability of the bus bar 210. That is, the present disclosure proposes a technique capable of balancing the flexibility and the assemblability of the bus bar 210.

Figure 10:
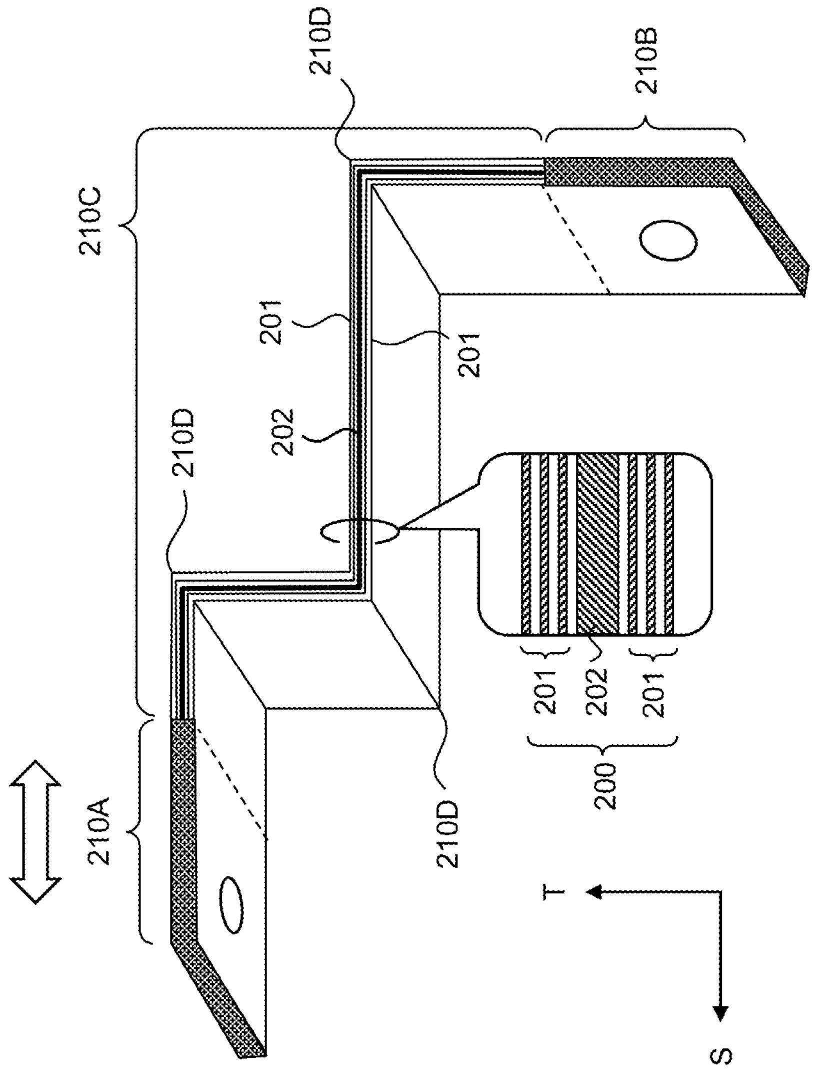
FIG. 10 is a schematic view for explaining another example of a bus bar using a plurality of metal plates according to an embodiment of the present disclosure.

FIG. 10 is a schematic view for explaining an example of the bus bar 210 using tge plurality of metal plates 200. A description overlapping with the case of the example shown in FIG. 8 will be omitted as appropriate.

The plurality of metal plates 200 include a plurality of types of metal plates having different thicknesses. For simplicity, a case where the plurality of metal plates 200 include two types of metal plates having different thicknesses will be described below. The same applies to cases of three or more types.

A relatively thin metal plate among the plurality of metal plates 200 is hereinafter referred to as a "first metal plate 201." On the other hand, a relatively thick metal plate among the plurality of metal plates 200 is hereinafter referred to as a "second metal plate 202." That is, the plurality of metal plates 200 include the first metal plate 201 and the second metal plate 202 thicker than the first metal plate 201. It should be noted that even the relatively thick second metal plate 202 is sufficiently thin as compared with the whole of the plurality of metal plates 200.

The relatively thick second metal plate 202 has a higher stiffness than the first metal plate 201 and thus is less likely to be deflected by the gravity. Even in the cantilevered state shown in FIG. 9, the posture (shape) of the second metal plate 202 is easily maintained. Therefore, the second metal plate 202 contributes to maintaining the posture (shape) of the bus bar 210 (the non-joined portion 210C) during the assembly. As a result, in the state shown in FIG. 5, the second connection portion 210B of the bus bar 210 is prevented from becoming largely away from the position of the terminal 121. In other words, in the state shown in FIG. 5, the bus bar 210 is kept such that the second connection portion 210B is positioned in the vicinity of the terminal 121. Therefore, the assemblability of the bus bar 210 is improved. Regarding the stiffness and the flexibility of the non-joined portion 210C, the relatively thick second metal plate 202 plays a dominant role. However, even the relatively thick second metal plate 202 is sufficiently thin as compared with the whole of the plurality of metal plates 200. Therefore, the flexibility of the non-joined portion 210C becomes sufficiently high as compared with a case where the plurality of metal plates 200 are joined to form one thick metal plate.

The relatively thin first metal plate 201 does not increase the stiffness of the non-joined portion 210C. In other words, the relatively thin first metal plate 201 does not reduce the flexibility of the non-joined portion 210C. In this sense, it can be said that the first metal plate 201 contributes to maintaining the flexibility of the bus bar 210 (the non-joined portion 210C). In addition, the first metal plate 201 contributes to securing the cross-sectional area of the non-joined portion 210C as a whole and reducing the resistance of the bus bar 210.

The numbers of the first metal plates 201 and the second metal plates 202 are not particularly limited. However, when at least one second metal plate 202 is present, the effect of improvement of the assemblability can be obtained. From a viewpoint of the flexibility, the number of the second metal plates 202 is preferably as small as possible. Therefore, the number of the second metal plate 202 may be one. On the other hand, the number of the first metal plates 201 is appropriately determined based on, for example, a magnitude of a current flowing through the bus bar 210.

Typically, the number of the first metal plates 201 is greater than the number of the second metal plates 202. In other words, the number of the second metal plates 202 is smaller than the number of the first metal plates 201. Accordingly, it is possible to efficiently secure the low resistance, the flexibility, and the assemblability regarding the bus bar 210 without unnecessarily reducing the flexibility.

The thicknesses of the first metal plate 201 and the second metal plate 202 are not particularly limited. As an example, the thickness of the first metal plate 201 is 0.3 mm or less. For example, the thickness of the first metal plate 201 may be 0.1 mm, 0.2 mm, 0.3 mm, etc. On the other hand, the thickness of the second metal plate 202 is 0.5 mm or more for example. In this case, in the cantilever state shown in FIG. 9, it is possible to particularly easily keep the posture (shape) of the second metal plate 202. For example, the thickness of the second metal plate 202 may be 0.5 mm, 0.8 mm, 1 mm, 1.2 mm, 1.5 mm, 2 mm, etc.

3-3. Effects

As described above, the bus bar 210 of the fuel cell unit 1 according to the present embodiment includes the non-joined portion 210C in which the plurality of metal plates 200 are stacked without being joined to each other. The flexibility of the non-joined portion 210C is remarkably increased as compared with a case where the plurality of metal plates 200 are joined to form one thick metal plate. The high flexibility of the non-joined portion 210C means that the non-joined portion 210C is easily deformed. Since the non-joined portion 210C is easily deformed, it is possible to easily absorb the environment-dependent displacement of the terminal and the variation in the relative positional relationship between the terminals.

In addition, since the plurality of metal plates 200 are stacked, the cross-sectional area of the non-joined portion 210C as a whole is sufficiently secured, which can prevent an increase in resistance. In other words, it is possible to secure the flexibility of the bus bar 210 without increasing the resistance of the bus bar 210.

Furthermore, the plurality of metal plates 200 in the non-joined portion 210C includes the first metal plate 201 and the second metal plate 202 thicker than the first metal plate 201. The relatively thick second metal plate 202 has a higher stiffness than the first metal plate 201, and thus is less likely to be deflected by the gravity. Therefore, the second metal plate 202 contributes to maintaining the posture (shape) of the bus bar 210 (the non-joined portion 210C) during the assembly. In other words, the second metal plate 202 improves the assemblability of the bus bar 210. On the other hand, the first metal plate 201 contributes to maintaining the flexibility and reducing the resistance of the bus bar 210 (the non-joined portion 210C). As described above, according to the present embodiment, it is possible to secure all of the "low resistance," the "flexibility," and the "assemblability" regarding the bus bar 210 of the fuel cell unit 1.

Moreover, in each of the first connection portion 210A and the second connection portion 210B, the plurality of metal plates 200 are joined to each other. Since the plurality of metal plates 200 are joined to each other, the stiffnesses of the first connection portion 210A and the second connection portion 210B are increased, and thus connection to the battery terminal 21 and the terminal 121 is facilitated.

4. VARIOUS EXAMPLES OF BUS BAR

Hereinafter, various examples of the bus bar 210 according to the present embodiment will be described.

4-1. First Example

Figure 11:
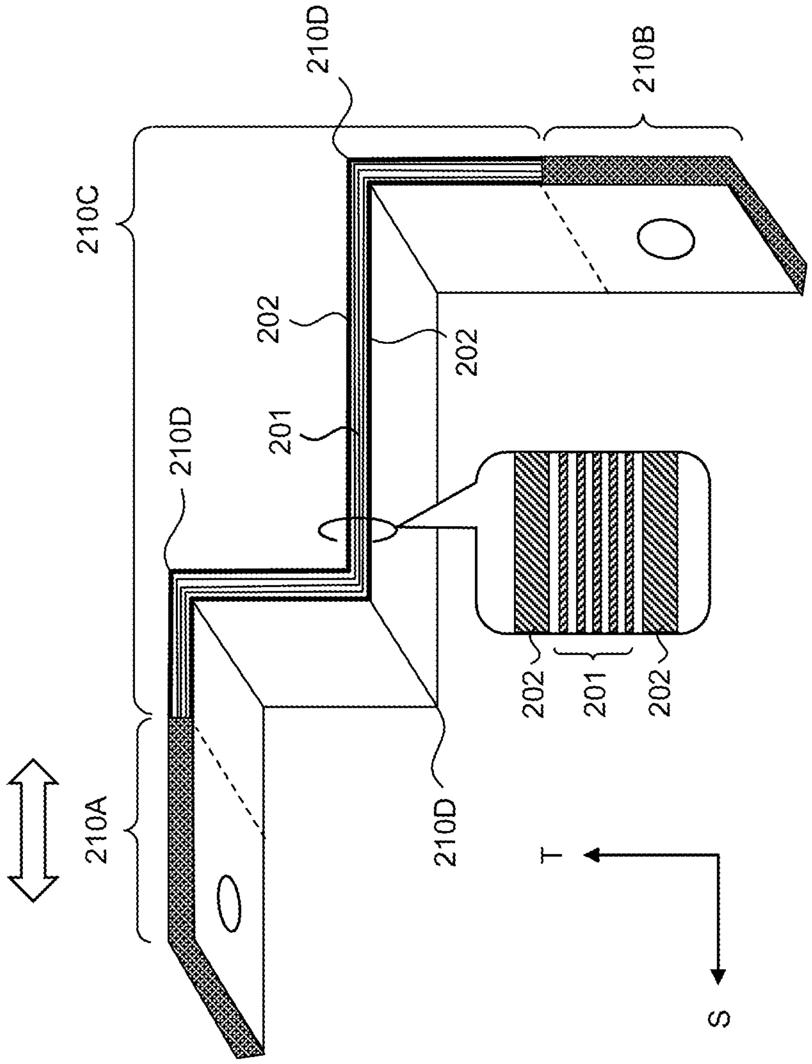
FIG. 11 is a schematic view showing a first example of the bus bar according to an embodiment of the present disclosure.

FIG. 11 is a schematic view showing a first example of the bus bar 210. In the first example, the number of the second metal plates 202 is two. The two second metal plates 202 are disposed at both ends of the plurality of metal plates 200 in the stack direction. The plurality of first metal plates 201 are sandwiched between the two second metal plates 202. For example, the thickness of each of the first metal plates 201 is 0.2 mm, and the thickness of each of the second metal plates 202 is 1 mm.

4-2. Second Example

Figure 12:
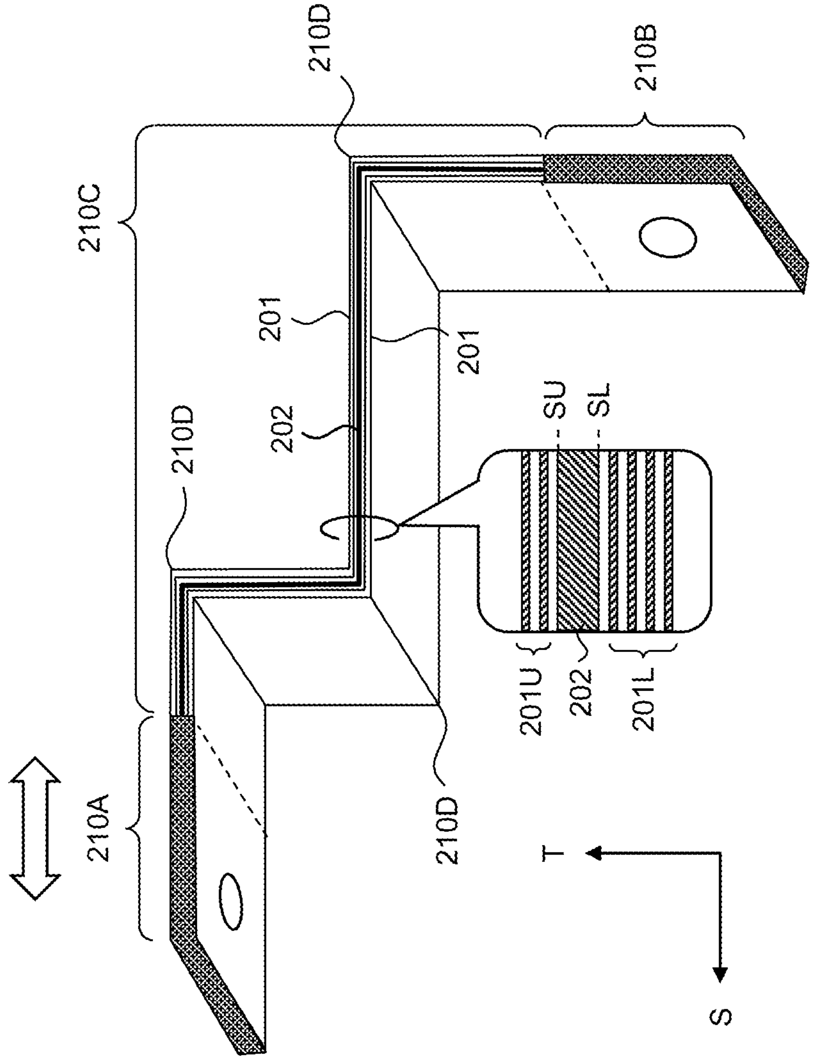
FIG. 12 is a schematic view showing a second example of the bus bar according to an embodiment of the present disclosure.

FIG. 12 is a schematic view showing a second example of the bus bar 210. In the second example, the number of first metal plates 201 is two or more. The second metal plate 202 is sandwiched between the two or more first metal plates 201. In other words, the second metal plate 202 is not disposed at both ends of the plurality of metal plates 200 in the stack direction.

For example, the number of the second metal plate 202 is one. As shown in FIG. 12, the second metal plate 202 has a surface SU and a surface SL opposed to each other. One or more first metal plates 201U are disposed on a side of the surface SU of the second metal plate 202. On the other hand, one or more first metal plates 201L are disposed on a side of the surface SL of the second metal plate 202. That is to say, the second metal plate 202 is sandwiched between one or more first metal plates 201U and one or more first metal plates 201L. For example, the thickness of each of the first metal plates 201 is 0.2 mm, and the thickness of the second metal plate 202 is 1 mm.

In the first example shown in FIG. 11, the first metal plates 201 are sandwiched between the two second metal plates 202. In that case, the second metal plates 202 on both sides of the first metal plates 201 may restrict deformation of the first metal plates 201. When the deformation of the first metal plates 201 is restricted, the flexibility of the non-joined portion 210C may be slightly reduced.

On the other hand, according to the second example, the second metal plate 202 is sandwiched between the plurality of first metal plates 201. In other words, the first metal plate 201 is not sandwiched between the second metal plates 202. Therefore, the first metal plate 201 in the second example is not restricted by the second metal plate 202 and thus can be deformed more freely than the first metal plate 201 in the first example. That is, according to the second example, the flexibility of the non-joined portion 210C is improved as compared with the case of the first example described above.

4-3. Third Example

Figure 13:
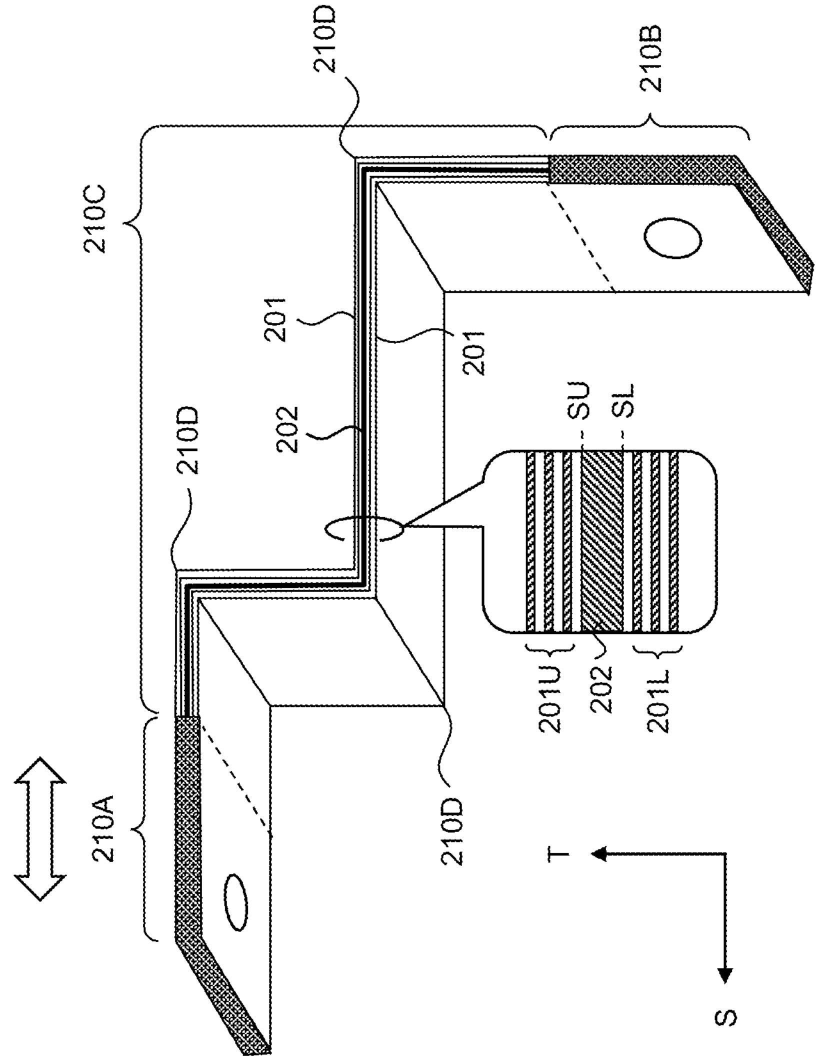
FIG. 13 is a schematic view showing a third example of the bus bar according to an embodiment of the present disclosure.

FIG. 13 is a schematic view showing a third example of the bus bar 210. The third example is a modification of the second example described above. A description overlapping with the second example will be omitted as appropriate.

According to the third example, the number of the first metal plates 201U present on the side of the surface SU of the second metal plate 202 is equal to the number of the first metal plates 201L present on the side of the surface SL of the second metal plate 202. In other words, the plurality of first metal plates 201 are equally divided into the side of the surface SU and the side of the surface SL by the second metal plate 202.

Although the stiffness of a single thin first metal plate 201 is extremely low, the stiffness increases to some extent when a plurality of first metal plates 201 come into contact with each other to be a bundle. From a viewpoint of the flexibility of the non-joined portion 210C, it is preferable that the number of the first metal plates 201 to be a bundle is small. According to the third example, the plurality of first metal plates 201 are equally divided by the second metal plate 202, and thus the number of the first metal plates 201 to be a bundle is minimized. Therefore, the flexibility of the non-joined portion 210C is improved as compared with the case of the second example described above.

4-4. Fourth Example

Figure 14:
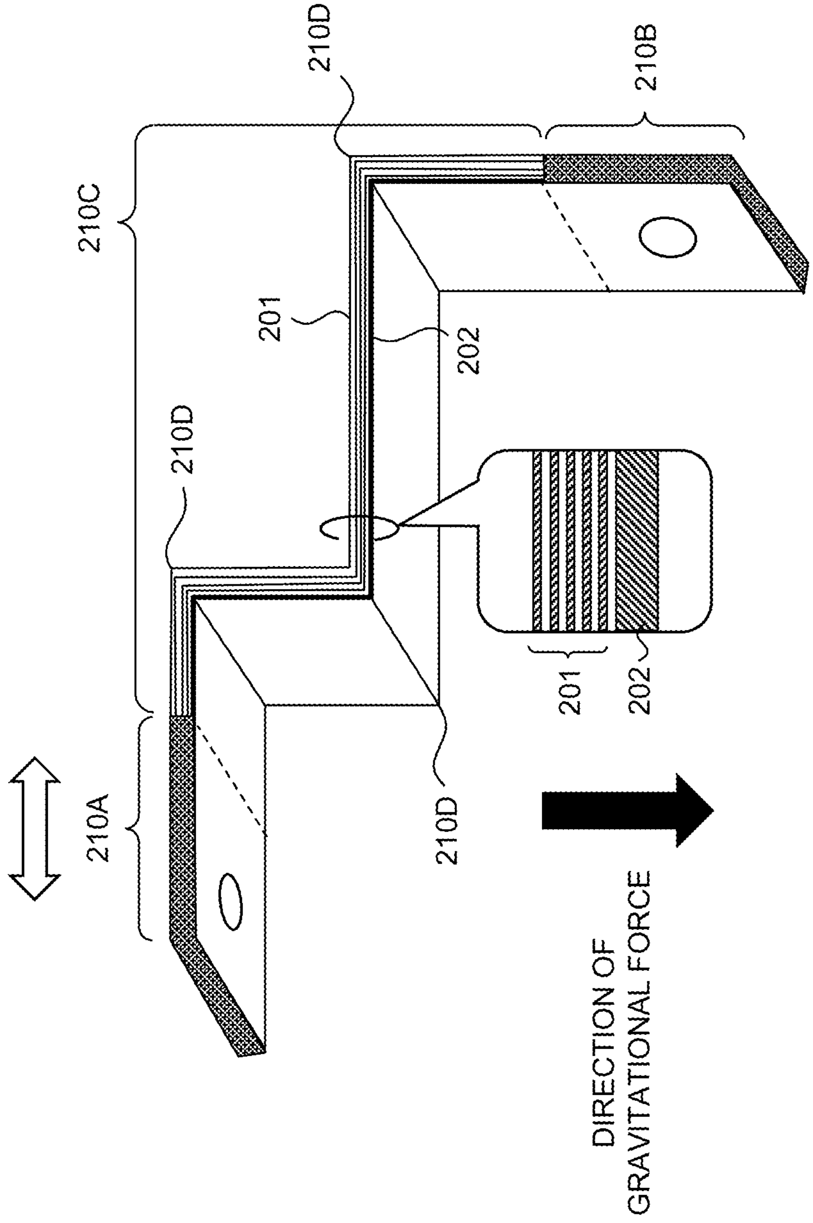
FIG. 14 is a schematic view showing a fourth example of the bus bar according to an embodiment of the present disclosure.

FIG. 14 is a schematic view showing a fourth example of the bus bar 210. In FIG. 14, a direction of gravitational force is indicated by an arrow. According to the fourth example, the second metal plate 202 is disposed lowermost in the direction of gravitational force among the plurality of metal plates 200. In other words, the plurality of first metal plates 201 are stacked on the second metal plate 202. For example, the thickness of each of the first metal plates 201 is 0.2 mm, and the thickness of the second metal plate 202 is 1 mm.

The first metal plate 201 which is relatively thin is likely to be deflected due to the gravity. However, according to the fourth example, the second metal plate 202 is present below the first metal plate 201, and the first metal plate 201 is supported by the second metal plate 202. Therefore, the deflection of the first metal plate 201 due to the gravity is prevented. As a result, the first metal plate 201 is prevented from being deflected and coming into contact with another component such as the electrical device 110. Even when another component is present in the vicinity of the bus bar 210, it is possible to secure a margin between the bus bar 210 and the other component.

4-5. Fifth Example

Figure 15:
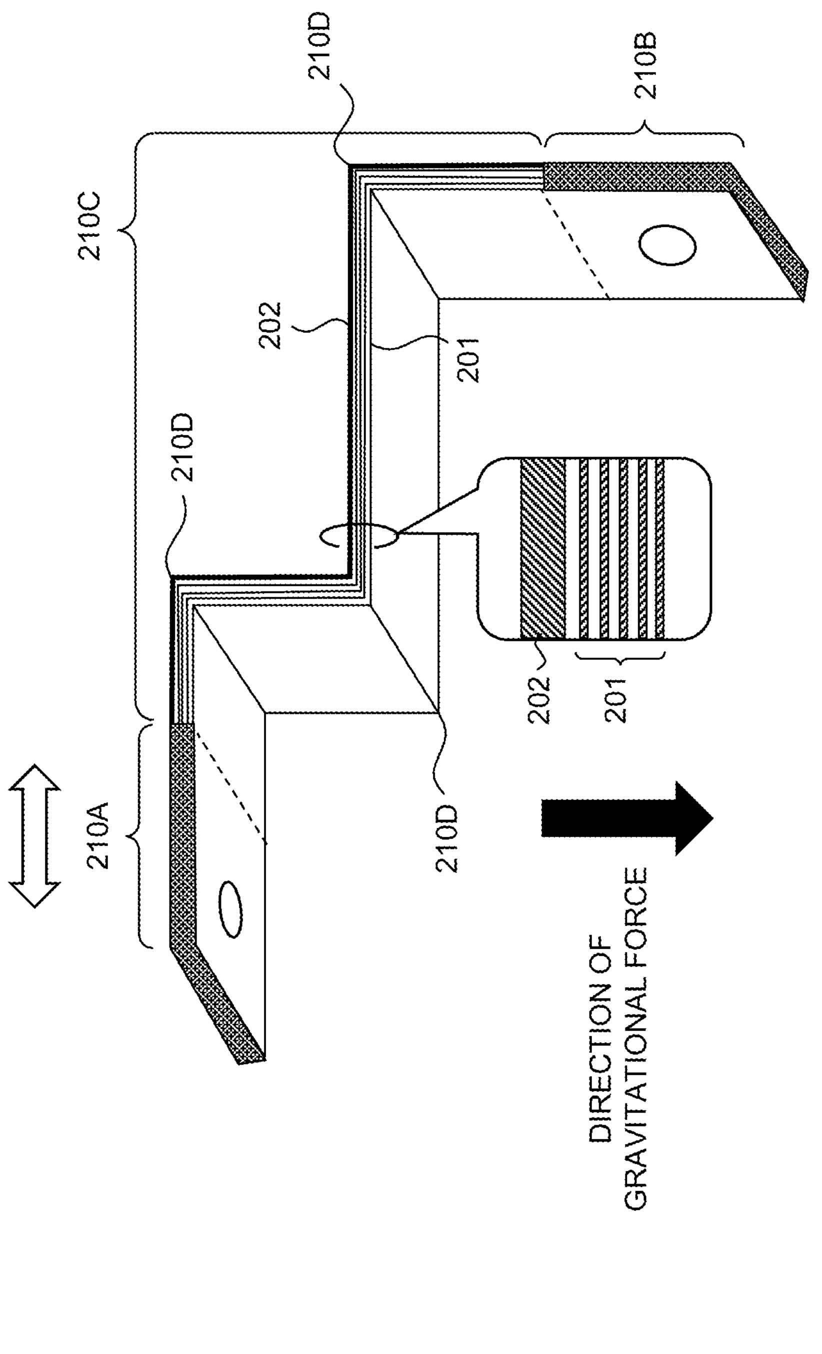
FIG. 15 is a schematic view showing a fifth example of the bus bar according to an embodiment of the present disclosure.

FIG. 15 is a schematic view showing a fifth example of the bus bar 210. In FIG. 15, the direction of gravitational force is indicated by an arrow. According to the fifth example, the second metal plate 202 is disposed uppermost in the direction of gravitational force among the plurality of metal plates 200. In other words, the second metal plate 202 is stacked on the plurality of first metal plates 201. The first metal plate 201 is not sandwiched between the plurality of second metal plates 202. For example, the thickness of each of the first metal plates 201 is 0.2 mm, and the thickness of the second metal plate 202 is 1 mm.

Although the stiffness of a single thin first metal plate 201 is extremely low, the stiffness increases to some extent when a plurality of first metal plates 201 come into contact with each other to be a bundle. From a viewpoint of the flexibility of the non-joined portion 210C, it is preferable that the number of the first metal plates 201 to be a bundle is small. According to the fifth example, the plurality of first metal plates 201 are easily dispersed in the direction of gravitational force and thus are unlikely to be a bundle. This is preferable from the viewpoint of flexibility of the non-joined portion 210C.

When there is a sufficient margin between the bus bar 210 and peripheral components, the first metal plate 201 does not come into contact with the peripheral components even in the arrangement in the fifth example.

4-6. Sixth Example

Figure 16:
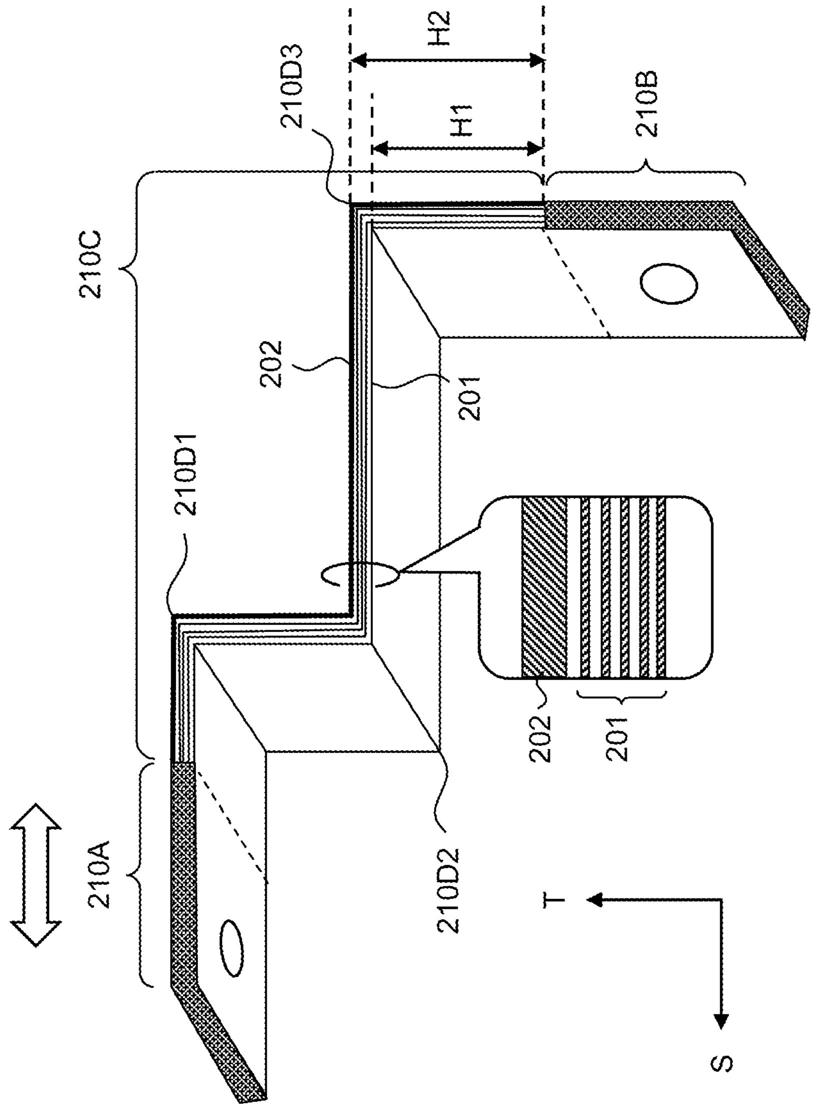
FIG. 16 is a schematic view showing a sixth example of the bus bar according to an embodiment of the present disclosure.

FIG. 16 is a schematic view showing a sixth example of the bus bar 210. The first connection portion 210A of the bus bar 210 is parallel to the S-direction, and the second connection portion 210B intersects with the S-direction. That is, a plane parallel to the first connection portion 210A and a plane parallel to the second connection portion 210B intersect with each other. Therefore, the non-joined portion 210C between the first connection portion 210A and the second connection portion 210B has at least one bent portion 210D.

In the example shown in FIG. 16, the non-joined portion 210C has three bent portions 210D1, 210D2, and 210D3. The bent portion 210D3 among them is closest to the second connection portion 210B. At the bent portion 210D3, the second metal plate 202 is located outermost among the plurality of metal plates 200. The first metal plate 201 is positioned on the inner side of the second metal plate 202. Accordingly, a length H2 of the second metal plate 202 between the second connection portion 210B and the bent portion 210D3 is greater than a length H1 of the first metal plate 201 between the second connection portion 210B and the bent portion 210D3 (H2>H1).

In other words, it is as follows. In the non-joined portion 210C, a total length of the second metal plate 202 is greater than a total length of the first metal plate 201. That is, in the non-joined portion 210C, the second metal plate 202 is longer than the first metal plate 201. In this case, the length H2 of the second metal plate 202 between the second connection portion 210B and the bent portion 210D3 is greater than the length H1 of the first metal plate 201 between the second connection portion 210B and the bent portion 210D3 (H2>H1).

Figure 17:
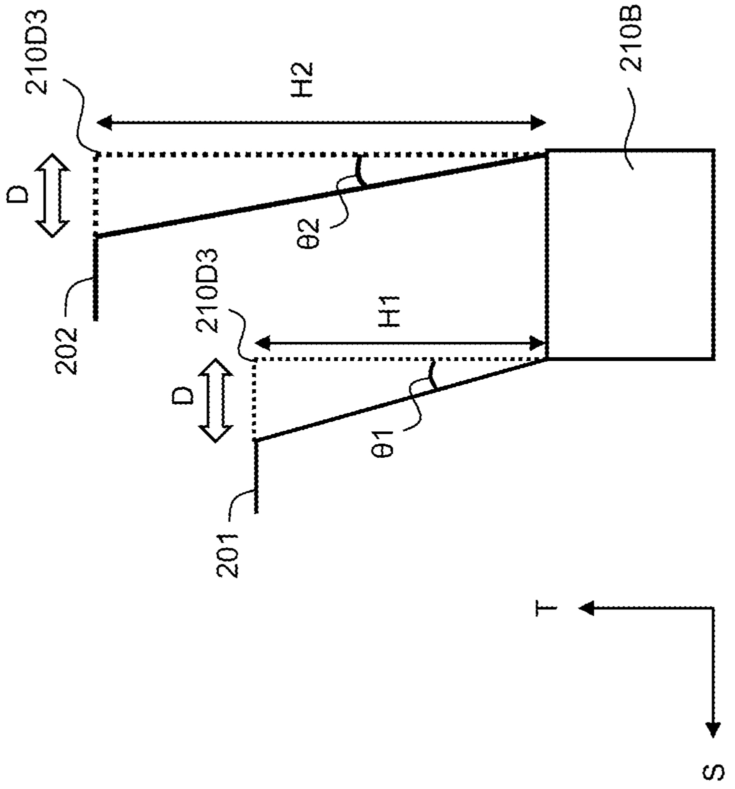
FIG. 17 is a conceptual diagram for explaining an effect obtained by the sixth example of the bus bar according to an embodiment of the present disclosure.

FIG. 17 is a conceptual diagram for explaining an effect of the bus bar 210 shown in FIG. 16. When the cell stack body 12 expands or contracts in the S-direction, the battery terminal 21 is displaced in the S-direction. Along with that, the non-joined portion 210C is deformed, and the first connection portion 210A of the bus bar 210 connected to the battery terminal 21 is also displaced in the S-direction. The bent portion 210D3 of the non-joined portion 210C is displaced in the S-direction by a displacement amount D. At this time, as shown in FIG. 17, each metal plate 200 is bent at a boundary between the second connection portion 210B and the non-joined portion 210C, which causes stress.

A bending angle of each metal plate 200 at the boundary between the second connection portion 210B and the non-joined portion 210C is as follows. The bending angle θ1 of the first metal plate 201 on the inner side is expressed by $\tan^{-1}$ (D/H1). On the other hand, the bending angle θ2 of the second metal plate 202 on the outer side is expressed by $\tan^{-1}$ (D/H2). As described above, since the length H2 is larger than the length H1 (H2>H1), the bending angle θ2 becomes smaller than the bending angle θ1 (θ2<θ1).

Under a condition that the bending angle is the same, the stress increases as the plate thickness increases. By making the bending angle θ2 of the relatively thick second metal plate 202 as small as possible, it is possible to effectively suppress the maximum stress value of the bus bar 210 as a whole.

4-7. Seventh Example

Figure 18:
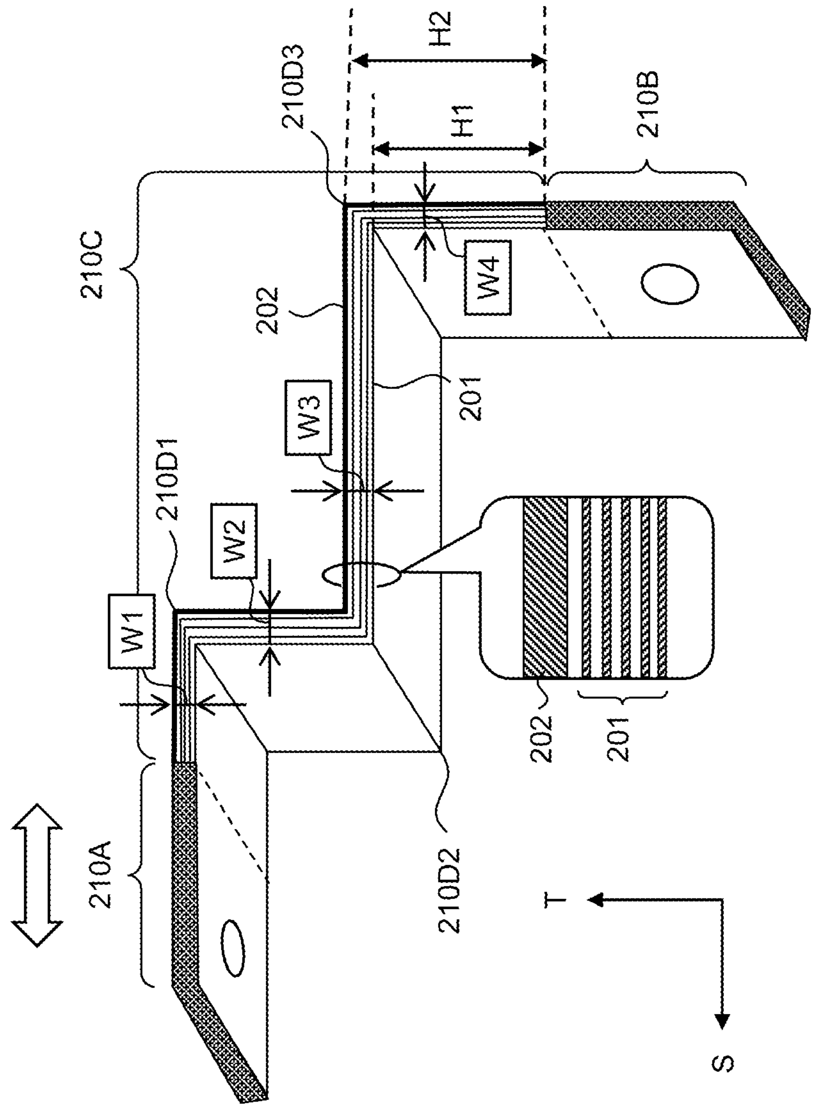
FIG. 18 is a schematic view showing a seventh example of the bus bar according to an embodiment of the present disclosure.

FIG. 18 is a schematic view showing a seventh example of the bus bar 210. The seventh example is a modification of the sixth example described above. A description overlapping with the sixth example will be omitted as appropriate.

A separation width W of the plurality of metal plates 200 in the non-joined portion 210C is considered. The separation width W is a distance between two outermost metal plates 200 among the plurality of metal plates 200 stacked. A separation width W2 of a section between the bent portion 210D1 and the bent portion 210D2 is larger than a separation width W1 of a section between the bent portion 210D1 and the first connection portion 210A (W2>W1). A separation width W3 of a section between the bent portion 210D3 and the bent portion 210D2 is larger than a separation width W4 of a section between the bent portion 210D3 and the second connection portion 210B (W3>W4). The separation width W1 and the separation width W4 may be equal to each other. The separation width W2 and the separation width W3 may be equal to each other.

In the section between the bent portion 210D1 and the bent portion 210D3, the separation widths W2 and W3 are relatively large, and thus the metal plates 200 are less likely to come into contact with each other, and the metal plates 200 are more easily deformed freely. In addition, since the separation width W3 is large, a difference between the length H2 and the length H1 becomes larger. Therefore, a higher effect can be expected with regard to the suppression of the maximum stress value described in the sixth example.

5. OTHERS

The features of the first bus bar 210 described above are also applicable to the second bus bar 220. As a result, it is possible to secure the low resistance, the flexibility, and the assemblability regarding the second bus bar 220 as well.

What is claimed is:

1. A fuel cell unit comprising:
a fuel cell stack in which a plurality of fuel cells are stacked;
an electrical device; and
a bus bar electrically connecting between a terminal of the fuel cell stack and a terminal of the electrical device, wherein
the bus bar includes a non-joined portion in which a plurality of metal plates are stacked without being joined to each other, and
the plurality of metal plates include a first metal plate and a second metal plate thicker than the first metal plate, and the second metal plate is smaller in number than the first metal plate.

2. The fuel cell unit according to claim 1, wherein
the non-joined portion includes a bent portion in which the plurality of metal plates are bent.

3. The fuel cell unit according to claim 1, wherein
the number of the second metal plate is one.

4. The fuel cell unit according to claim 1, wherein
the bus bar further includes:
a first connection portion connected to the terminal of the fuel cell stack; and
a second connection portion connected to the terminal of the electrical device, and
the non-joined portion is present between the first connection portion and the second connection portion.

5. The fuel cell unit according to claim 4, wherein
the plurality of metal plates are joined to each other in each of the first connection portion and the second connection portion.

6. A fuel cell unit comprising:
a fuel cell stack in which a plurality of fuel cells are stacked;
an electrical device; and
a bus bar electrically connecting between a terminal of the fuel cell stack and a terminal of the electrical device, wherein
the bus bar includes a non-joined portion in which a plurality of metal plates are stacked without being joined to each other, and
the plurality of metal plates include a first metal plate and a second metal plate thicker than the first metal plate, and wherein
a number of the first metal plate is two or more, and
the second metal plate is sandwiched between the two or more first metal plates.

7. The fuel cell unit according to claim 6, wherein
the second metal plate has a first surface and a second surface opposite to the first surface, and
a number of the first metal plate present on a side of the first surface of the second metal plate is equal to a number of the first metal plate present on a side of the second surface of the second metal plate.

8. A method of assembling a fuel cell unit that includes a fuel cell stack in which a plurality of fuel cells are stacked and an electrical device, the method comprising:

forming a bus bar in which a plurality of metal plates including a first metal plate and a second metal plate thicker than the first metal plate are stacked, wherein the second metal plate is smaller in number than the first metal plate;

electrically connecting a first connection portion of the bus bar to a terminal of the fuel cell stack; and electrically connecting a second connection portion of the bus bar to a terminal of the electrical device, wherein the forming the bus bar includes joining the plurality of metal plates to each other in each of the first connection portion and the second connection portion without joining the plurality of metal plates to each other in a non-joined portion between the first connection portion and the second connection portion.

* * * * *